July 19, 1966 H. TOWNE 3,262,021

PANEL MOUNTED INDICATOR LIGHT

Filed March 20, 1963 2 Sheets-Sheet 1

INVENTOR.
HERBERT TOWNE

BY

Kemon, Palmer, Stewart & Estabrook
ATTORNEYS

July 19, 1966 H. TOWNE 3,262,021

PANEL MOUNTED INDICATOR LIGHT

Filed March 20, 1963 2 Sheets-Sheet 2

INVENTOR.
HERBERT TOWNE

BY

Komon, Palmer, Stewart & Estabrook

ATTORNEYS

United States Patent Office 3,262,021

Patented July 19, 1966

3,262,021

PANEL MOUNTED INDICATOR LIGHT

Herbert Towne, Roslyn, N.Y., assignor to Dialight Corporation, Brooklyn, N.Y., a corporation of New York Filed Mar. 20, 1963, Ser. No. 266,680
4 Claims. (Cl. 317—101)

This invention relates to panel indicator lights and more particularly to a new and compact modular assembly wherein all of the electrical components are compactly housed within a unitary structure which is easily mounted in a panel by inserting a threaded portion of the housing through an opening in the panel and affixing a nut to the portion of the housing extending through the panel opening.

With the advent of transistor-controlled panel indicator lights, it has become a problem to house the various electrical components in a sufficiently small and lightweight structure to occupy a minimum of space and to permit ready replacement of the entire structure without the need of soldered connections and the like. It is also a problem so to house the various electrical components including the transistor, the light and the various resistors in a sufficiently rigid manner that the entire unit is relatively insensitive to mechanical vibrations and shock.

Accordingly, it is the principal object of the present invention to provide a compact, rigid, unitary housing for a transistorized panel light indicator which is capable of easy assembly and which can be quickly and easily mounted and dismounted in an opening in a panel.

It is a further object of the present invention to provide a self-contained transistorized panel indicator lamp in which the various electrical components are compactly mounted in such a way as to be insensitive to mechanical vibration and shock.

Other objects of the present invention will be apparent from the following detailed description taken in conjunction with the attached sheets of drawings in which.

In general, the objects of the present invention are achieved by providing a compact insulating housing which receives the transistor and its associated resistors in a concentric configuration, the elements then ultimately being housed within a tubular metallic outer container having a transparent portion surrounding the indicator light itself and also having a threaded portion to facilitate mounting of the entire assembly in a panel of any desired electronic equipment.

Figure 1:
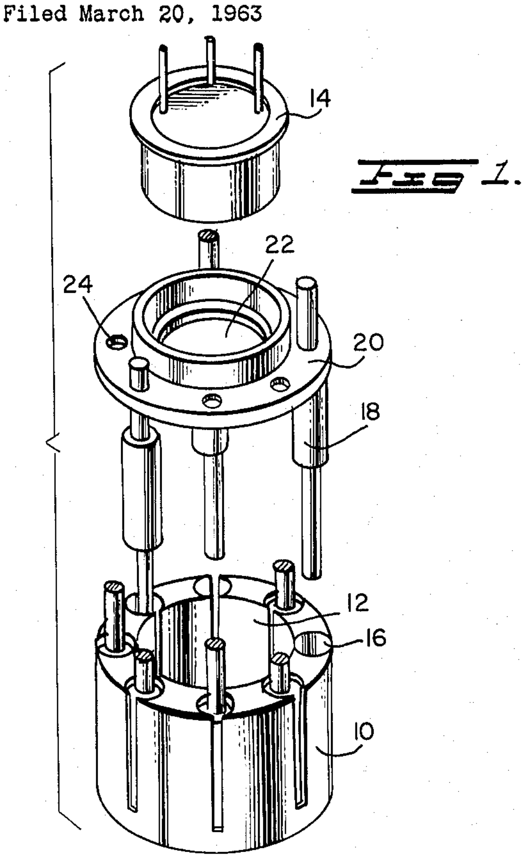
FIG. 1 is an exploded perspective view of the resistors, the transistor and the housing for these elements.
Figure 2:
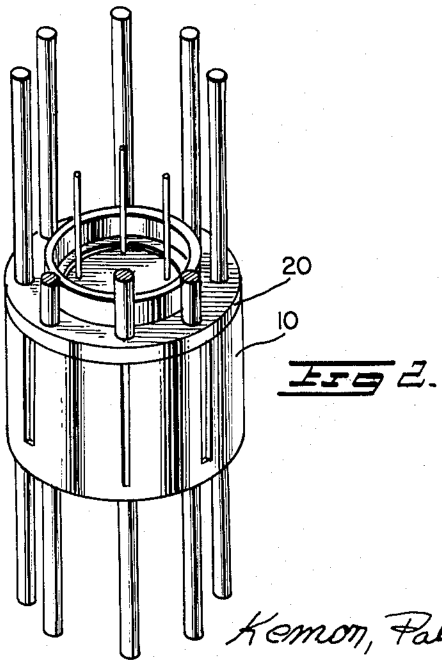
FIG. 2 is a view similar to FIG. 1 but showing the components in their assembled relationship.

Turning now to the figures in the drawing for a detailed description of the present invention, it will be seen that in FIG. 1, the basic component of the assembly comprises an insulating cylindrical block 10 having a counter bore 12 sized to snugly receive a transistor 14. Surrounding the counter bore, there are a series of annularly arranged circular counter bores 16 each sized to snugly receive one of the resistors 18 which form components of the electrical circuit interconnecting the indicator lamp and the transistor. A plurality of resistors 18 are shown equal in number to the number of counter bores surrounding the central counter bore. The upper ends of the resistor mounting counter bores 16 are, of course, the full diameter of the resistor and open through the end face of the body member 10 while the opposite end of these counter bores are drilled through the opposite face of the body member with smaller openings sized to receive only the conductive leads of the resistors. Thus, it will be seen that in the assembly process, that the resistors can be dropped into the counter bores with one lead extending axially outwardly of the lower end of the body member and the other conductive lead extending axially from the opposite end. Conveniently, the counter bores 16 also open at least partially into the peripheral space of the body member 10 which allows the color bands of the resistors 18 to be plainly visible after they have been inserted into the counter bores. In order to secure the resistors within the main body member, a flanged disc-like insulating washer member 20 is provided which has a central opening 22 corresponding in internal diameter to that of the central counter bore 12 in the body member 10. Annularly arranged around the periphery of the insulating washer member are a series of openings 24 sized to receive the leads from the resistors 18 and having radial spacings to correspond with the radial spacings of the plurality of counter bores 16 in the body member 10. As shown most clearly in FIG. 2 therefore, once the resistors 18 have been placed within the counter bores 16, the washer member is oriented to receive the leads of the transistors and then pushed downwardly over the resistor leads so that it overlies the upper open face of the body member and prevents axial movement of the resistors therein. Then the transistor may be inserted through the opening 22 in the washer member so that it extends downwardly and into the counter bore 12 of the body member 10. The assembled relationship of the components thus far discussed therefore is as shown in FIG. 2.

Figure 3:
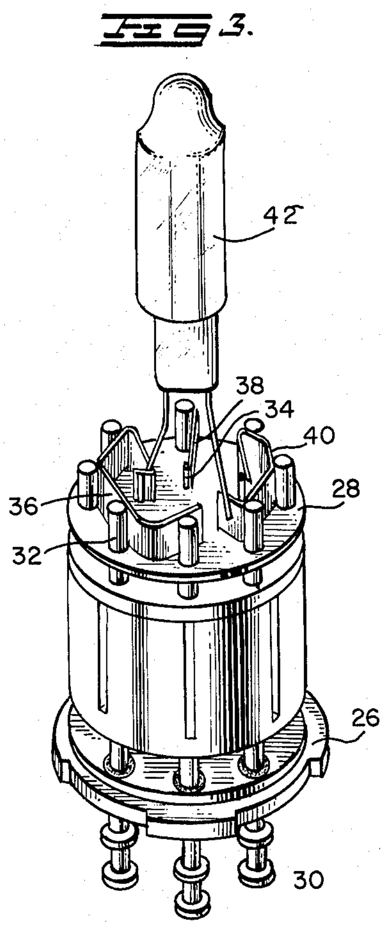
FIG. 3 shows the addition of other structural components together with the electrical connections for the indicator lamp itself.

Turning now to FIG. 3, the next step in the assembly of the indicator lamp in accordance with the present invention is shown. Here it will be noted that the leads of the resistors 18 as shown in FIG. 2 have been trimmed and a base structure 26 together with an upper insulating washer member 28 have been added.

It will be seen that the base structure 26 includes on its upper surface printed or soldered connections between various resistor leads and that it also carries 3 axially extending connector pins 30 which are the means affording electrical connection of the entire assembly to the circuit with which it is to be used. The upper washer member 28 contains an annularly arranged series of openings 32 corresponding in number and spacing to the disposition of the resistors in the base member 10 and that, therefore, receive the upper ends of the resistor leads. In addition to this annularly arranged series of openings, there are also 3 additional openings 34 arranged in the center portion of the washer member 28 and these openings receive the three leads from the transistor. This same washer member also forms a support for connector members 36, 38 and 40 which establish electrical connection between the resistors, the transistor and the indicator lamp 42.

The indicator lamp, which may conveniently be of the gaseous diode type, is shown with its leads connected to members 36 and 40. Similar connections are established on the lower insulating member and it will be noted that this is spaced axially of the main insulating body portion to permit room for these connections. The base member 26, also formed of insulating material, completes the inner assembly portion of the panel light indicator.

Figure 4:
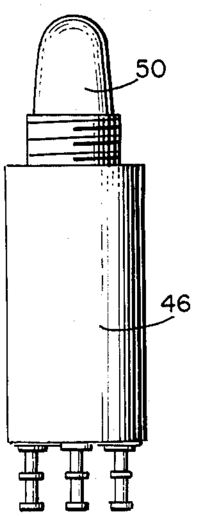
FIG. 4 shows in side elevation a completely assembled indicator lamp in accordance with the present invention.
Figure 5:
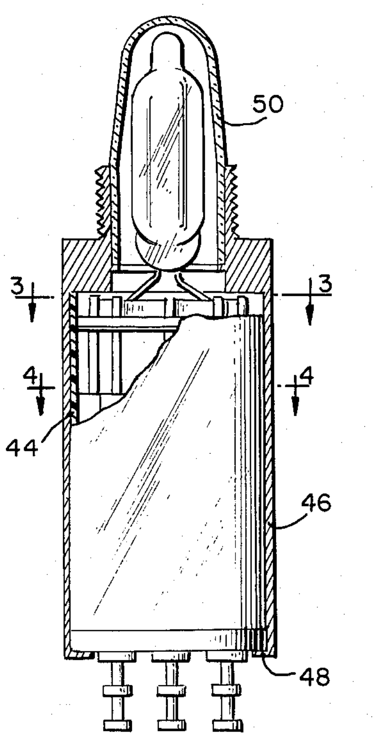
FIG. 5 is a view similar to FIG. 4 but enlarged and with parts broken away to show the interior construction features.

Turning now to FIGS. 4 and 5, which show the completely assembled device, it will be seen that the assembly of FIG. 3 is first enclosed in an insulating sleeve member 44 which is effective to insulate the various electrical components from the inner wall of the metallic housing 46 of the completed assembly. Once the sleeve has been inserted over the circuitry, the assembly of FIG. 3 is then inserted into the housing as shown in FIG. 5 and the lower portion of the housing includes finger members 48 which may be bent radially inwardly to secure the entire assembly in place. The portion at the upper end of the outer assembly includes a transparent window 50 which surrounds the gas-filled diode and therefore permits indication of the firing of the diode to be viewed from the front of the panel. The threaded portion of the outer housing is, of course, used for mounting of the completed assembly in the panel.

Figure 6:
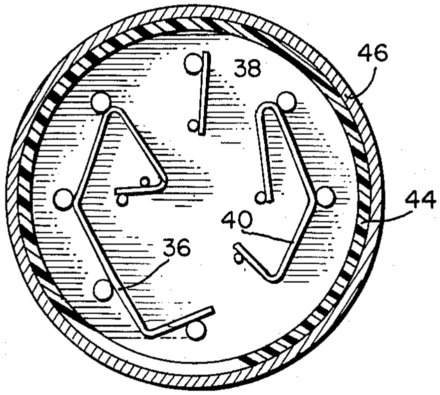
FIG. 6 is a section on the lines 3—3 of the FIG. 5.
Figure 7:
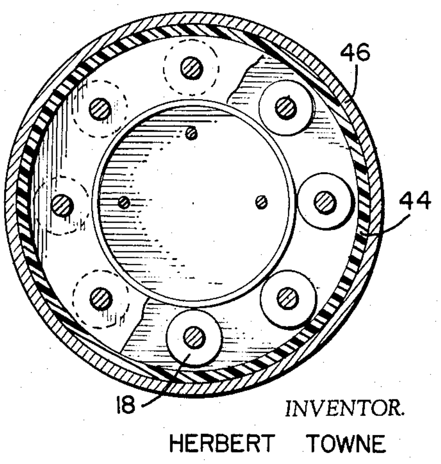
FIG. 7 is a section on the lines 4—4 of the FIG. 5.

FIGS. 6 and 7 are merely sections on the lines 3—3 and 4—4 of FIG. 5 and show the internal structure of the assembled article.

From the foregoing it will be apparent to those skilled in the art that there is herein shown and described a new and useful modular structure for a transistor-operated panel light indicator. Obviously there will be modifications which will occur to those skilled in the art which are nevertheless intended to be encompassed within the scope of the appended claims.

I claim:

1. In a transistor controlled panel-mounted indicator light, a modular assembly comprising:
(1) a first cylindrical insulating body having a central counterbore sized to snugly receive a transistor;
(2) a plurality of annularly arranged counterbores surrounding said central counterbore, substantially coextensive therewith, for snugly receiving passive circuit elements, said plurality of counterbores opening through one end of said body to their full diameter and opening through the other end of said body in a relatively smaller diameter;
(3) a plurality of passive circuit elements mounted in said plurality of counterbores;
(4) a second insulating member substantially washer-shaped, having inside and outside diameters substantially the same as said first insulating body, and having an annularly arranged series of openings therethrough equal in number to said plurality of counterbores and positioned concentrically therewith, in contact with said first body member to retain said plurality of electrical components therein;
(5) a transistor inserted through said second insulating member and received within said central counterbore in said first insulating member;
(6) and means for holding said body members in assembled relation.

2. The combination defined by claim 1 in which said plurality of counterbores open through at least the outer peripheral wall of said cylindrical insulating body to render visible the color coding of said passive circuit elements.

3. A panel light indicator assembly comprising:
(1) a first cylindrical insulating body having a central counterbore sized to snugly receive a transistor;
(2) a plurality of annularly arranged counterbores surrounding said central counterbore, substantially coextensive therewith, for snugly receiving passive circuit elements, said plurality of counterbores opening through one end of said body to their full diameter and opening through the other end of said body in a relatively smaller diameter;
(3) a plurality of passive circuit elements mounted in said plurality of counterbores;
(4) a first insulating substantially washer-shaped member having inside and outside diameters substantially the same as said first insulating body, and having an annularly arranged series of openings therethrough equal in number to said plurality of counterbores and positioned concentrically therewith, in contact with said first body member to retain said plurality of electrical components therein;
(5) a transistor inserted through said washer-shaped insulating member and received within said central counterbore in said first insulating body;
(6) a second substantially washer-shaped insulating member having an annular arranged series of openings therethrough corresponding in spacing and diameter to those in said first washer-shaped insulating member, positioned adjacent said first insulating washer-shaped member in parallel relationship thereto;
(7) connector means arranged on said second insulating member and establishing electrical connections between said passive circuit elements and said transistor;
(8) a gaseous diode having its leads connected to said connector means for establishing electrical connection thereto and for supporting said gaseous diode on said assembly;
(9) a third washer-shaped insulating member positioned concentrically with said first insulating body and at the end thereof remote from said second insulating member, said third insulating member carrying on one surface connections between the opposite ends of said passive circuit elements for completing the electrical circuit between said diode, said transistor and said passive circuit elements;
(10) a plurality of connector pins extending axially from said third washer-shaped insulating member, said pins being connected at their inner ends to the said connections on said third insulating member and affording connection of electrical voltages for operation of said gaseous diode through said passive circuit elements and said transistor;
(11) an insulating sleeve snugly receiving and surrounding at least said first and second insulating members;
(12) and a metallic housing for receiving said assembly said housing including a transparent portion surrounding said gaseous diode and further including means for retaining said assembly within said housing.

4. The combination as defined by claim 3 in which said metallic housing includes a threaded portion adjacent said transparent portion to facilitate mounting of the assembly in an opening in an indicator panel.

No references cited.

ROBERT K. SCHAEFER, *Primary Examiner.*

W. C. GARVERT, *Assistant Examiner.*